United States Patent [19]

Yamauchi

[11] Patent Number: 5,524,721
[45] Date of Patent: Jun. 11, 1996

[54] SEAT ARRANGEMENT OF INDUSTRIAL VEHICLE

[75] Inventor: Yoshihiko Yamauchi, Ayase, Japan

[73] Assignee: Ikeda Bussan Co., Ltd., Ayase, Japan

[21] Appl. No.: 207,154

[22] Filed: Mar. 8, 1994

[30] Foreign Application Priority Data

Mar. 31, 1993 [JP] Japan .................................. 5-094890

[51] Int. Cl.⁶ .............................. B62D 25/10; B60N 2/04
[52] U.S. Cl. ........................ 180/69.2; 296/65.1; 187/222; 297/325; 297/335
[58] Field of Search .................................. 180/69.2, 69.21; 297/DIG. 110, 325, 326, 327, 334, 335; 296/65.1; 187/222; 248/351, 598

[56] References Cited

U.S. PATENT DOCUMENTS

| | | | |
|---|---|---|---|
| 1,559,614 | 11/1925 | Haynes | 297/334 |
| 3,225,857 | 12/1965 | De Haan et al. | 180/69.2 |
| 3,261,422 | 7/1966 | Jensen | 297/326 |
| 3,394,772 | 7/1968 | Abold | 180/69.2 |
| 3,976,157 | 8/1976 | Wahnemuehl | 180/69.2 |
| 4,312,418 | 1/1982 | Rittman | 180/69.21 |
| 4,359,121 | 11/1982 | Messner et al. | 180/69.21 |
| 4,364,602 | 12/1982 | Rigazio | 297/334 |
| 4,395,011 | 7/1983 | Torta | 297/335 |
| 4,565,407 | 1/1986 | Brautigam | 297/335 |
| 4,586,579 | 5/1986 | Matsui et al. | 180/69.21 |
| 4,696,508 | 9/1987 | Brautigam | 296/65.1 |
| 4,720,143 | 1/1988 | Schwartz et al. | 297/326 |
| 4,785,900 | 11/1988 | Nasky | 180/69.21 |
| 5,230,544 | 7/1993 | Morritt et al. | 297/336 |
| 5,286,076 | 2/1994 | DeVoss et al. | 296/65.1 |

*Primary Examiner*—Brian L. Johnson
*Assistant Examiner*—Min Yu
*Attorney, Agent, or Firm*—Foley & Lardner

[57] ABSTRACT

A seat arrangement of a forklift truck includes a hood for covering an engine, a seat mounted on the hood, a seat slide mechanism and a supporting member. A seat cushion of the seat is pivotally secured at its front end portion to an upper rail of the seat slide mechanism. The supporting member has a first end which is pivotally secured to an upper surface of the hood and a second end which is engageable with an engaging portion of the seat. When it is necessary to open the hood, the seat positioned at a certain position in a fore-and-aft direction is swung forwardly, then the second end of the supporting member is brought into engagement with the engaging portion of the seat to keep the seat at a certain angle defined between a bottom surface of the seat cushion and the upper surface of the hood, and then the hood is opened. As the seat is positioned more forward through the seat slide mechanism, the certain angle decreases so that the seat is prevented from abutment with a LP-gas cylinder and a head guard of the forklift truck when the hood is opened.

12 Claims, 4 Drawing Sheets

SEAT ARRANGEMENT OF INDUSTRIAL VEHICLE

BACKGROUND OF THE INVENTION

1. Field of the Invention

The present invention relates to a seat arrangement of an industrial vehicle such as a forklift truck having, for example, a LP-gas cylinder behind the seat.

2. Description of the Prior Art

In order to clarify the task of the present invention, one conventional seat arrangement of an industrial vehicle such as a forklift truck will be outlined with reference to FIGS. 4 and 5 of the accompanying drawings.

A forklift truck 10 has a fork mechanism portion 12, a body 14, an engine (not shown), a hood 16 for covering the engine, a driver's seat 18 mounted on the hood 16, a balance weight 20 positioned behind the hood 16, a LP-gas cylinder 22 mounted on the balance weight 20, and a head guard 24. The head guard 24 has a left vertical portion 24a, a right vertical portion (not shown) and a lateral horizontal portion (not shown) uniting an upper end portion of the left vertical portion 24a with an upper end portion of the right vertical portion. The left and right vertical portions are spaced from each other such that the seat 18 is allowed to pass therebetween when the hood 16 is rearwardly swung (see FIG. 5). The hood 16 is secured to the body 14 through a first hinge member (not shown). Thus, when it is necessary to inspect the engine, the hood 16 is rearwardly swung about a hinge shaft of the first hinge member to uncover the engine. The seat 18 is secured at its front end to a front end portion of an upper surface of the hood 16 through a second hinge member (not shown). When it is necessary to inspect the engine, the hood 16 is rearwardly swung by one hand of an operator while the seat 18 is swung frontward and then kept at a certain angular position relative to the upper surface of the hood 16 by the other hand of the operator to prevent abutment of the seat 18 with the lateral horizontal portion of the head guard 24 and the LP-gas cylinder 22. With this, the seat 18 is allowed to pass between the left and right vertical portions and below the lateral horizontal portion of the head guard 24. However, this operation is troublesome because both hands of the operator must be used. Furthermore, depending on the angle of the seat relative to the upper surface of the hood 16, the seat 18 is brought into abutment with the lateral horizontal portion of the head guard 24 or the LP-gas cylinder 22.

SUMMARY OF THE INVENTION

It is therefore an object of the present invention to provide a seat arrangement of an industrial vehicle such as a forklift truck having a LP-gas cylinder or the like behind the seat, an engine hood and a head guard, in which, when the engine hood is rearwardly swung, the seat is easily kept at a certain angle relative to the engine hood even if the seat is positioned at any sliding position in a fore-and-aft direction such that the seat is not brought into abutment with the head guard nor with the LP-gas cylinder or the like.

According to the present invention, there is provided a seat arrangement of a vehicle, comprising:

an openable member which is pivotally secured at a rear end portion thereof to a body of the vehicle such that said openable member is rearwardly pivotable to open the same;

a seat slide mechanism including a lower rail which is fixedly secured to an upper surface of said openable member and an upper rail which is mounted on the lower rail so as to be slidable thereon in a fore-and-aft direction;

a seat having a seat cushion, a seatback and an engaging portion, the seat cushion being mounted on the upper rail and pivotally secured at a front end portion thereof to said upper rail such that said seat is slidable in a fore-and-aft direction and is pivotable forwardly;

a supporting member having a first end which is pivotally secured to the upper surface of said openable member and a second end which is engageable with the engaging portion of said seat;

a first member which is a part of the vehicle and positioned behind said seat when said seat is at a proper position; and a second member which is a part of the vehicle and positioned above said seat when said seat is at the proper position, wherein, when it is necessary to open said openable member, said seat positioned at a certain position in a fore-and-aft direction is swung forwardly, then the second end of said supporting member is brought into engagement with the engaging portion of said seat to keep said seat at a certain angle defined between a bottom surface of the seat cushion and the upper surface of said openable member, and then said openable member is opened, and wherein, as said seat is positioned more forward through said seat slide mechanism, the certain angle decreases so that said seat is prevented from abutment with said first and second members when the openable member is opened.

DETAILED DESCRIPTION OF THE INVENTION

Figure 1:
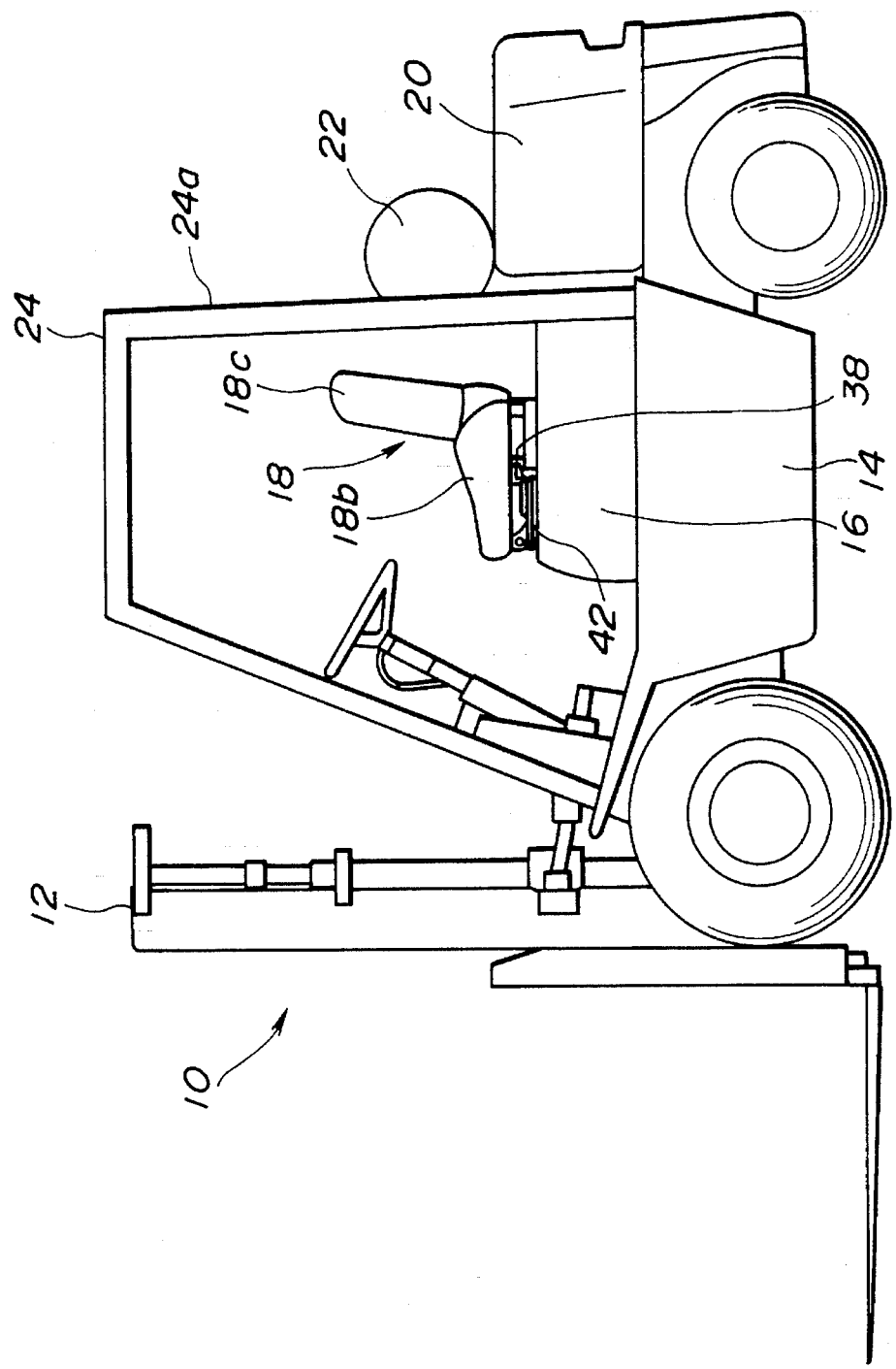
FIG. 1 is a side view of a forklift truck having a seat arrangement according to the present invention.
Figure 2:
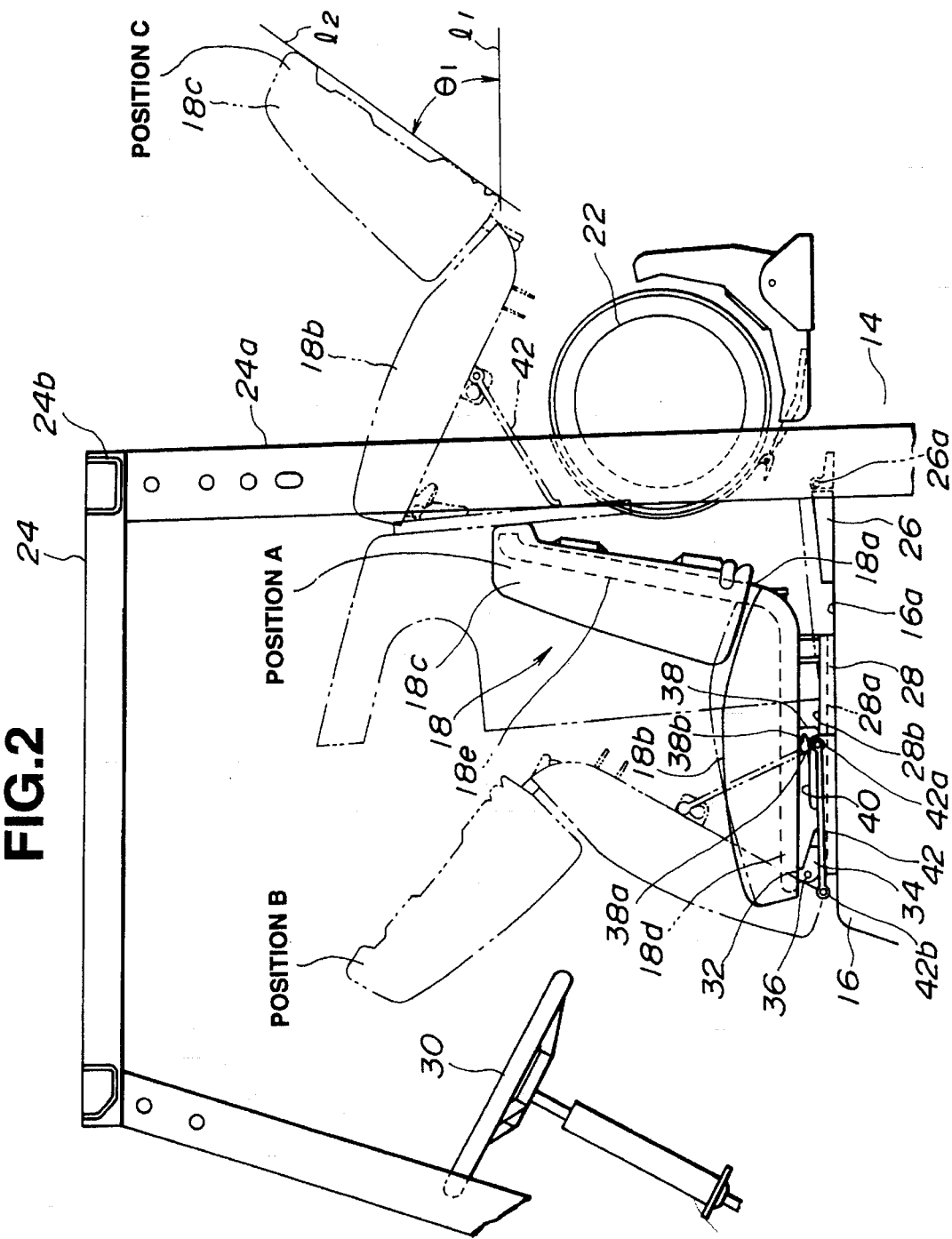
FIG. 2 is an enlarged side view showing the operation of the seat arrangement according to the present invention when the seat takes the rearmost position.
Figure 3:
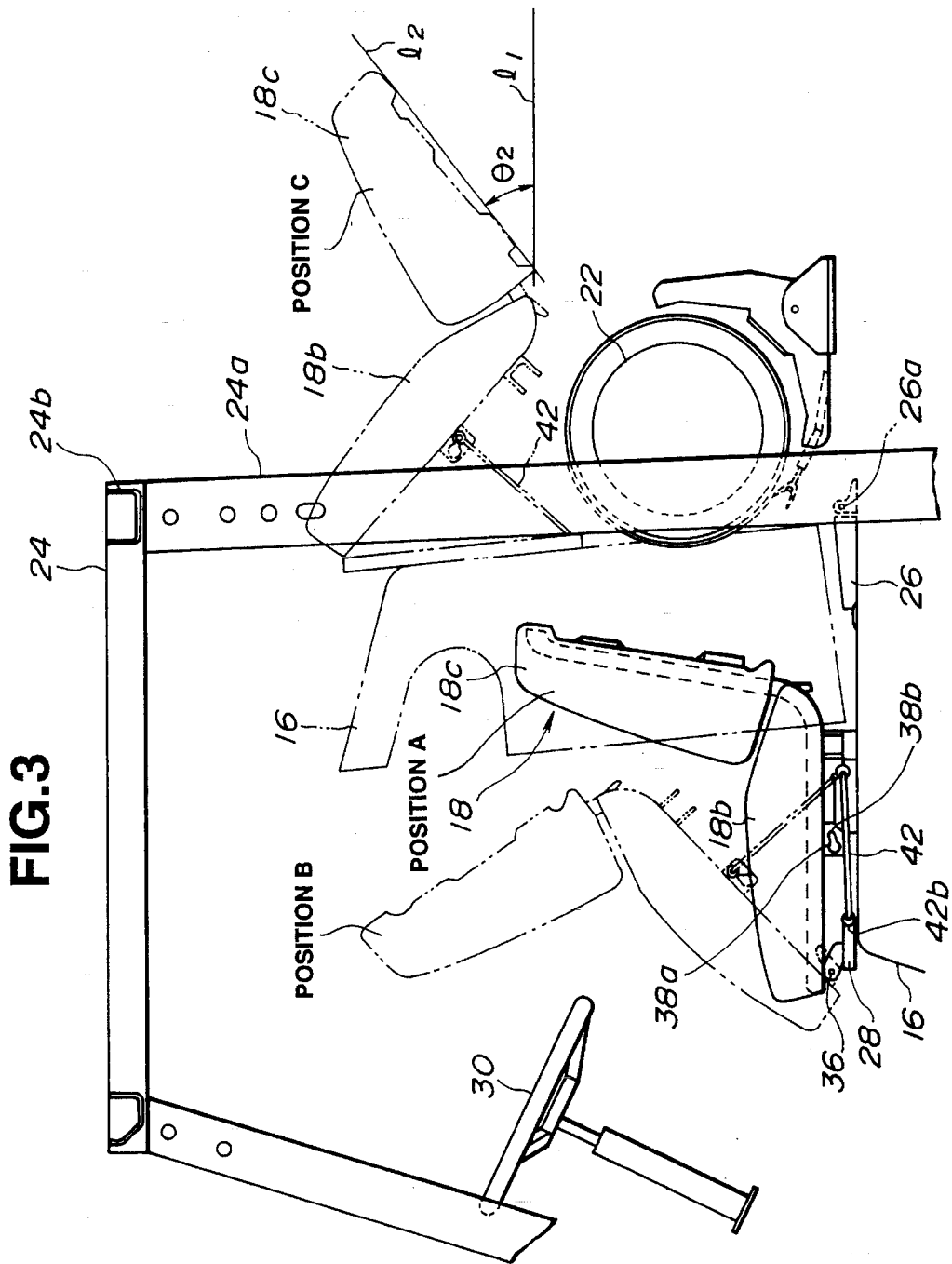
FIG. 3 is a view similar to FIG. 2, but showing a condition wherein the seat takes the frontmost position.
Figure 4:
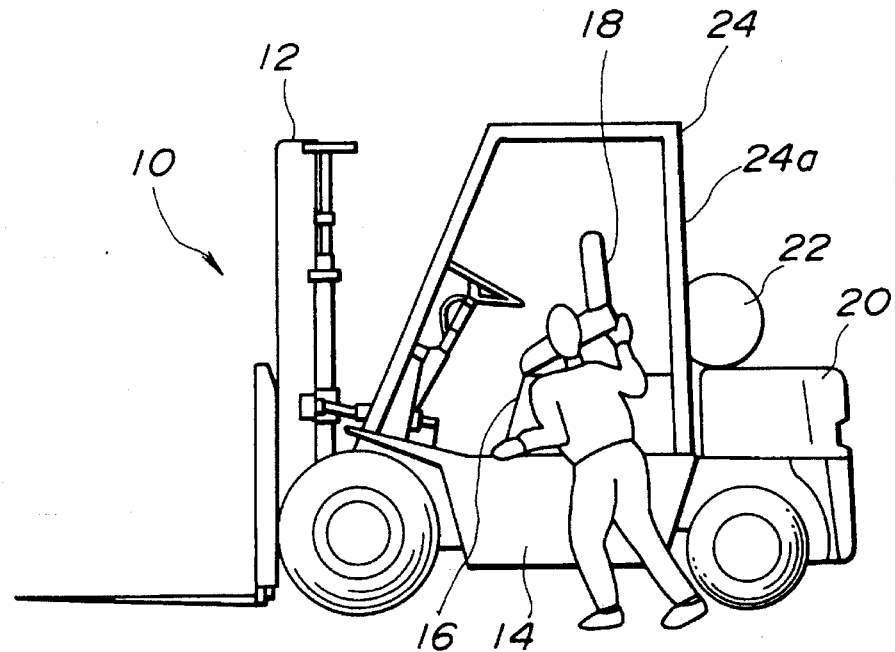
FIGS. 4 and 5 are side views showing sequential operation of a conventional seat arrangement of a forklift truck.
Figure 5:
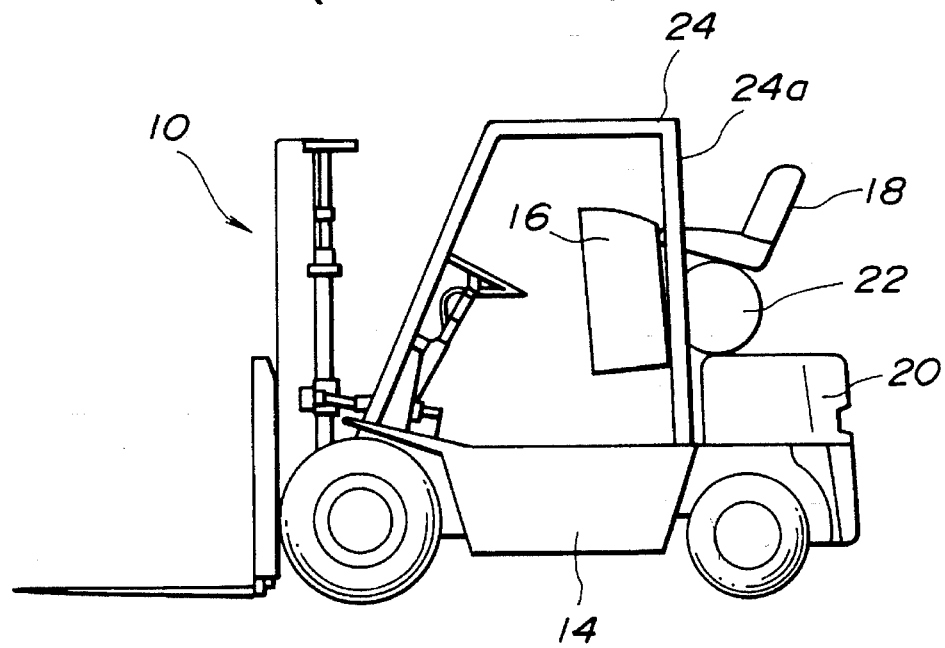

With reference to FIGS. 1 to 3, a seat arrangement of a forklift according to the present invention will be described in the following.

Parts substantially the same as those of the above-mentioned conventional forklift are denoted by the same numerals and a detailed explanation of them will be omitted from the following description.

As is seen from FIGS. 1 and 2, a hood 16 is secured to a body 14 of the forklift 10 through a first hinge member 26. Therefore, the hood 16 can be rearwardly swung about a hinge shaft 26a of the first hinge member 26 when it is necessary to inspect an engine (not shown) of the forklift 10. A seat slide mechanism 28 is mounted on an upper surface 16a of the hood 16 and comprises a lower rail 28a fixed on the upper surface 16a of the hood 16 and an upper rail 28b mounted on the lower rail 16a so as to be slidable thereon in a fore-and-aft direction.

The seat 18 comprises a seat frame 18a, a seat cushion 18b and a seatback 18c. The seat cushion 18b is mounted on a horizontal portion 18d of the seat frame 18a. The seatback 18 is mounted on a vertical portion 18e of the seat frame 18a. The horizontal portion 18d is secured at its front end portion to a front end portion of the upper rail 28b through a second hinge member such that the seat 18 is swingable forward toward a steering wheel 30 of the forklift 10. The second hinge member comprises a first hinge bracket 32 fixed to the front end portion of the horizontal portion 18d of the seat frame 18a, a second hinge bracket 34 fixed to the front end portion of the upper rail 28b, and a hinge shaft 36 connecting the first and second hinge brackets 32, 34 together. Thus, the seat 18 is swingable about the hinge shaft 36.

A plate 38 is fixed to a middle portion of the horizontal portion 18d of the seat frame 18a and has an inserting hole 38a and an engaging hole 38b which are united with each other.

A supporting bracket 40 is fixed to the upper surface 16a of the hood 16 and positioned on the outside of the lower rail 28a. A supporting rod 42 is swingably secured at its base portion 42a to the supporting bracket 40 and has an end portion 42b which is engageable with the engaging hole 38b of the plate 38.

Operation of a seat arrangement according to the present invention will be described in the following.

As is seen from FIG. 2, when it is necessary to inspect the engine (not shown) and the seat 18 is positioned at the rearmost position in a fore-and-aft direction through the seat slide mechanism 28, at first, the seat 18 is swung forward toward a steering wheel 30 about the hinge shaft 36 of the second hinge member from Position A to Position B. Then, the end portion 42b of the supporting rod 42 is inserted into the inserting hole 38a and then engaged with the engaging hole 38b of the plate 38. With this, as is shown by Position B in FIG. 2, the seat 18 is kept at a certain angular position relative to the upper surface 16a of the hood 16. Under this condition, the hood 16 is swung rearwardly about the hinge shaft 26a of the first hinge member 26. With this, the seat 18 is passed below a lateral horizontal portion 24b of the head guard 24 and between the left vertical portion 24a and the right vertical portion of the head guard 24, and moved from Position B to Position C in FIG. 2. At Position C, the seat 18 is positioned above a LP-gas cylinder 22. At Position C, the angle $\eta_1$ between a horizontal line $l_1$ and a line $l_2$ defined by a back surface of the seatback 18c is determined to be a certain value so as to prevent abutment of the seat 18 with the lateral horizontal portion 24b of the head guard 24 and the LP-gas cylinder 22. For this purpose, for example, the position of the supporting bracket 40 relative to the seat slide mechanism 28, the length of the supporting rod 42 and the position of the plate 38 are carefully determined, respectively.

As is seen from FIG. 3, when it is necessary to inspect the engine and the seat 18 is positioned at the frontmost position in a fore-and-aft direction through the seat slide mechanism 28, at first, the seat 18 is swung forward toward the steering wheel 30 about the hinge shaft 36 of the second hinge member from Position A to Position B. Then, the end portion 42b of the supporting rod 42 is inserted into the inserting hole 38a and then engaged with the engaging hole 38b of the plate 38. With this, as is shown by Position B in FIG. 3, the seat 18 is kept at a certain angular position relative to the upper surface 16a of the hood 16. It should be noted that the angle between the upper surface 16a of the hood 16 and the bottom surface of the seat cushion 18b under a condition wherein the seat 18 is positioned at the frontmost position (see Position B in FIG. 3) is smaller than that under a condition wherein the seat 18 is positioned at the rearmost position (see Position B in FIG. 2) because the supporting bracket 40 is fixedly secured to the hood 16 and, on the other hand, the seat 18 is movable in a fore-and-aft direction on the hood 16. That is, as the seat 18 is positioned more forward through the seat slide mechanism 28, the angle between the upper surface 16a and the bottom surface of the seat cushion 18b decreases. Under a condition wherein the seat 18 is positioned at the frontmost position, the hood 16 is swung rearwardly about the hinge shaft 26a of the first hinge member 26. With this, the seat 18 is passed below the lateral horizontal portion 24b of the head guard 24 and between the left vertical portion 24a and the right vertical portion of the head guard 24, and moved from Position B to Position C in FIG. 3. At Position C, the seat 18 is positioned above the LP-gas cylinder 22. At Position C, the angle $\theta_2$ between the horizontal line $l_1$ and the line $l_2$ defined by a back surface of the seatback 18c is determined to be a certain value so as to prevent abutment of the seat 18 with the lateral horizontal portion 24b of the head guard 24 and the LP-gas cylinder 22. For this purpose, as is mentioned hereinabove, for example, the position of the supporting bracket 40 relative to the seat slide mechanism 28, the length of the supporting rod 42 and the position of the plate 38 are carefully determined. As shown in FIGS. 2 and 3, the angle $\theta_2$ is smaller than the angle $\theta_1$ by a predetermined certain angle. Therefore, even if the seat 18 is at the frontmost position, the seat 18 is not brought into abutment with the lateral horizontal portion 24b of the head guard 24. In other words, the angle $\theta_1$ is larger than the angle $\theta_2$ by the predetermined certain angle. Therefore, even if the seat 18 is at the rearmost position, the seat 18 is not brought into abutment with the LP-gas cylinder 22.

Thus, even if the seat 18 is at any sliding position in a fore-and-aft direction through the seat slide mechanism 28, the seat 18 is not brought into abutment with the lateral horizontal portion 24b of the head guard 24 nor with the LP-gas cylinder 22 when the hood 16 is rearwardly swung. Furthermore, as compared with the above-mentioned conventional seat arrangement, it is not necessary to support the seat 18 by one hand of an operator to swing the hood 16. Therefore, according to the present invention, the swing operation of the hood 16 becomes very easy.

What is claimed is:

1. A seat arrangement in a vehicle having an openable member pivotally secured at a rear end portion thereof to a body of the vehicle such that the openable member is rearwardly pivotable about a first pivot to open the openable member, and first and second obstruction members, comprising:

a seat slide mechanism including a lower rail fixedly secured to the openable member and an upper rail slideably mounted on the lower rail, the upper rail being slideable in a fore-and-aft direction relative to the lower rail;

a seat pivotally mounted to the upper rail about a second pivot and positionable between a use position and a non-use position, the seat having a seat portion, a seatback portion and a seat engaging portion underneath the seat portion, a front end of the seat portion being pivotally mounted to the upper rail so that the seat is slidable in the fore-and-aft direction and pivotable relative to the openable member;

a supporting member having a first end pivotally secured to the openable member below the seat and a second end securable to the seat engaging portion for maintaining the seat portion at a certain angle relative to the openable member, in the non-use position when the supporting member is secured to the seat engaging portion;

wherein the seat is positioned in front of the first obstruction member when the seat is in the use position and is positioned below the second obstruction member in the use and non-use positions and wherein the seat is swung back along with the openable member between the first and second obstruction members, without the seat being obstructed thereby or resting thereon, when the openable member is opened and the seat is in the non-use position, wherein the certain angle is variable according to a fore-and-aft position of the seat relative to the openable member, the certain angle decreasing as the seat is positioned toward the front, away from the first pivot.

2. A seat arrangement according to claim 1, wherein the vehicle is a forklift truck.

3. A seat arrangement according to claim 2, wherein said first member is a LP-gas cylinder of the forklift truck.

4. A seat arrangement according to claim 2, wherein said second member is a lateral horizontal portion of a head guard of the forklift truck.

5. A seat arrangement according to claim 2, wherein said openable member is a hood for covering an engine of the forklift truck.

6. A seat arrangement according to claim 1, wherein the engaging portion is secured to a middle portion of the seat portion.

7. A seat arrangement in a vehicle having an openable member pivotally secured at a rear end portion thereof to a body of the vehicle such that the openable member is rearwardly pivotable about a first pivot to open the openable member, and first and second obstruction members, comprising:

a seat slide mechanism including a lower rail fixedly secured to the openable member and an upper rail slideably mounted on the lower rail, the upper rail being slideable in a fore-and-aft direction relative to the lower rail;

a seat pivotally mounted to the upper rail about a second pivot and positionable between a use position and a non-use position, the seat having a seat portion, a seatback portion and a seat engaging portion underneath the seat portion, a front end of the seat portion being pivotally mounted to the upper rail so that the seat is slidable in the fore-and-aft direction and pivotable relative to the openable member; and a supporting means securable to the seat engaging portion for maintaining the seat in the non-use position where the seat portion is oriented at an angle relative to the openable member, in the non-use position, for preventing the seat from abutting the first and second obstruction members when the openable member is swung open, wherein the seat is positioned in front of the first obstruction member when the seat is in the use position and is positioned below the second obstruction member in the use and non-use positions, and wherein the seat is swung back between the first and second obstruction members, without the seat being obstructed thereby or resting thereon, when the openable member is opened and the seat is in the non-use position, and wherein, when the securing means is secured to the seat engaging portion, the angle is variable by moving the seat in the fore-and-aft direction relative to the openable member, wherein the angle decreases as the seat is moved toward the front, away from the first pivot.

8. A seat arrangement according to claim 7, wherein the vehicle is a forklift truck.

9. A seat arrangement according to claim 8, wherein said first member is a LP-gas cylinder of the forklift truck.

10. A seat arrangement according to claim 8, wherein said second member is a lateral horizontal portion of a head guard of the forklift truck.

11. A seat arrangement according to claim 8, wherein said openable member is a hood for covering an engine of the forklift truck.

12. A seat arrangement according to claim 7, wherein the engaging portion is secured to a middle portion of the seat portion.

\* \* \* \* \*